United States Patent [19]

Talley et al.

[11] 4,118,316

[45] Oct. 3, 1973

[54] QUATERNIZED SILICEOUS SUPPORTS FOR GEL PERMEATION CHROMATOGRAPHY

[75] Inventors: Charles P. Talley, Prosperity, Pa.; Guy M. Bradley, Chesterfield, Mo.; Ronald T. Guliana, Monroe, Mich.

[73] Assignee: Calgon Corporation, Pittsburgh, Pa.

[21] Appl. No.: 731,969

[22] Filed: Oct. 13, 1976

[51] Int. Cl.$^2$ .......................................... B01D 15/08
[52] U.S. Cl. ............................. 210/31 C; 210/198 C; 210/502; 428/406
[58] Field of Search ............... 210/31 C, 198 C, 502; 55/67, 386; 428/405, 406

[56] References Cited

U.S. PATENT DOCUMENTS

| | | | |
|---|---|---|---|
| 3,326,875 | 6/1967 | Moore | 210/31 C |
| 3,514,925 | 6/1970 | Bossart | 55/386 |
| 3,577,266 | 5/1971 | Kirkland | 210/198 C |
| 3,666,530 | 5/1972 | Aue et al. | 55/386 X |
| 3,722,181 | 3/1973 | Kirkland et al. | 55/67 |
| 3,962,206 | 6/1976 | Butler | 210/31 C |
| 3,983,299 | 9/1976 | Regnier | 428/406 X |
| 3,993,443 | 11/1976 | Guenthner | 428/406 X |
| 4,029,583 | 6/1977 | Chang et al. | 210/502 |
| 4,039,463 | 8/1977 | De Roo et al. | 428/406 X |
| 4,488,922 | 1/1970 | Kirkland | 55/67 |

OTHER PUBLICATIONS

"Glycerolpropylsilane Bonded Phases in the Steric Exclusion Chromatography of Biological Macromolecules", F. E. Regnier and R. Noel, Journal of Chromatography Science, vol. 14, pp. 316–320, Jul. 1976.

"Chemically Bonded Packings for Chromatography", Chapter 1, Bonded Stationary Phases in Chromatography, M. Lynn and A. M. Filbert, pp. 1–11, 1974.

"Aqueous GPC of Water Soluble Polymers by High Pressure Liquid Chromatography Using Glyceryl CPG Columns", C. Persiani, P. Cukor and K. French, Journal of Chromatography Science, vol. 14, pp. 417–421, Sep. 1976.

The Manufacturing Technology of Continuous Glass Fibres by Loewenstein Elsevier Scientific Pub. Co., New York, pp. 203–206, 210, 211, 1973.

*Primary Examiner*—John Adee
*Attorney, Agent, or Firm*—Rudolph J. Anderson, Jr.; Mario A. Monaco; Martin L. Katz

[57] ABSTRACT

Controlled porosity supports having a siliceous surface are treated with a silane compound followed by treatment with a quaternizing agent to introduce quaternary ammonium moieties on the beads which are used to perform molecular size separations on cationic polymers.

17 Claims, 5 Drawing Figures

QUATERNIZED SILICEOUS SUPPORTS FOR GEL PERMEATION CHROMATOGRAPHY

BACKGROUND OF THE INVENTION

Gel permeation chromatography is a form of chromatography which fractionates polymers and determines their molecular weight and molecular weight distribution. It is a type of liquid-solid elution chromatography that uses a column packed with an inert porous matrix which is eluted with a compatible solvent. This technique has been used for fractionating polymers since the separation is made according to molecular size or weight, based on the degree to which each molecular species is able to diffuse into the porous matrix. In this manner, the largest molecular species, or molecular weight fraction, penetrates the matrix the least and is eluted first.

U.S. Pat. No. 3,326,875 discloses the use of this method with swellable polystyrene beads to separate nonionic, high molecular weight hydrophobic polymers and U.S. Pat. No. 3,962,206 discloses the use of this technique with treated swellable polystyrene beads to separate ionic polymers. While the swellable quaternized styrene beads disclosed in U.S. Pat. No. 3,962,206 have been successfully used to fractionate cationic polymers, they have several disadvantages. For example, the swellable gel is not readily adaptable to high speed techniques of gel permeation of chromatography; bischloromethylether, which is used in the synthesis of the quaternized gel, is a carcinogen requiring special handling; pore sizes greater than 2000 Å are not obtainable so that very high molecular weight polymers cannot be fractionated; eluting solvents cannot be changed over a wide range since irreversible collapse of the gel is easily effected; and the presence of hydrophobic regions has been observed to cause adsorption of cationic polymers which also have hydrophobic regions, as for example partially quaternized poly(2-vinylpyridine).

Accordingly, it is an object of this invention to provide a porous support for the gel permeation chromatography of cationic polymers.

It is a further object of this invention to provide a porous support for the gel permeation chromatography of cationic polymers which may be prepared by simple, rapid, reproducible and non-hazardous procedures.

It is still a further object of this invention to provide a porous support for the gel permeation chromatography of cationic polymers which can be used with a wide variety of aqueous organic eluents and is stable to strongly acid eluents over an extended period of time.

It is another object of this invention to provide a porous support for the gel permeation chromatography of cationic polymers that is rigid and non-compressible or non-swellable, thereby permitting utilization in high speed techniques.

It is still another object of this invention to provide a porous support for the gel permeation chromatography of cationic polymers which does not adsorb these polymers.

It is still another object of this invention to provide a porous support for the gel permeation chromatography of cationic polymers which can fractionate the highest molecular weight polymers presently known.

SUMMARY OF THE INVENTION

This invention relates to quaternized controlled porosity supports having a siliceous surface for the gel permeation chromatography of cationic polymers in order to separate the polymer into molecular weight fractions. The quaternized porous supports of this invention are prepared by reacting a silane compound with a controlled porosity support having a siliceous surface followed by a quaternization reaction.

DETAILED DESCRIPTION OF THE INVENTION

Controlled porosity supports are rigid porous granules of high silica glass permeated by interconnecting pores of uniform and precisely controlled size in order to create a rigid, insoluble column packing that is unaffected by changes in solvent system or pressure. The closely controlled pore size results in sharp exclusion limits, high resolution and high reproducibility. Since these materials do not compact, high flow rates may be obtained. Pore size may vary from about 50 to about 25,000 Angstroms, depending on the type of separation desired.

The controlled porosity support having a siliceous surface is treated with a silane compound in accordance with the procedure set forth in Bonded Stationary Phases in Chromatography, E. Grushka, ed., Ann Arbor Science Publishers Inc., Ann Arbor, Michigan, p. 4–8, 1974. The mechanism of this reaction involves the condensation of the ester, ether, halide or silanol functional group on the silane with the silanols on the silica surface. This reaction is carried out in aqueous solution and at elevated temperatures in order to maximize the silane loading of the glass substrate.

One having ordinary skill in the art will select any silanizing agent which forms a silicon ether bond with the reactive silicon on the surface of the support and which will react with a quaternizing agent. For example, one having ordinary skill in the art may use silanes of the formula:

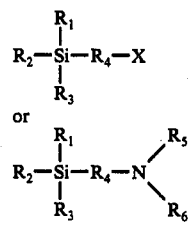

wherein
$R_1$, $R_2$ and $R_3$ each may be halogen, hydroxy, alkoxy, aryloxy, or an alkyl or aryl ester;
$R_4$ may be a hydrocarbon chain containing one to eight carbon units per quaternizable X group or a single aryl ring;
$R_5$ and $R_6$ each may be hydrogen or a hydrocarbon chain containing one to four carbon units; and,
X is halogen.

In the preferred embodiments of this invention, $R_4$ is a hydrocarbon chain containing one to four carbon units per quaternizable X group and X is chloro.

Representative compounds of the above generic formulas include:

(CH₃COO)₃ Si(CH₂)₂ Cl (CH₃O)₃ Si(CH₂)₃ N(H)CH₃

(CH₃O)₃ Si(CH₂)₃ N(H) (CH₂)₂NH₂

The siliceous support is treated with an aqueous solution of the silanizing agent at elevated temperature. The treated support is filtered, washed and dried overnight at 100° C. to polymerize the silicone layer. The resulting support is treated with a solution of the quaternizing agent in a neutral aqueous buffer at 85° C. overnight, washed with water and dried.

One having ordinary skill in the art will select a suitable quaternizing agent from those compounds of the formula:

$$R_7-X \quad \text{III.}$$

or

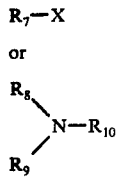   IV.

wherein
  $R_7$, $R_8$, $R_9$ and $R_{10}$ each may be a hydrocarbon chain containing one to four carbon units per quaternized group or other hydrophilic group or a single aryl ring; and,
  X is halogen.

Representative compounds of the above generic formulas include:

CH₃Cl

CH₃(CH₂)₂Br

CH₃CH₂I (CH₃)₃N (CH₃)₂NC₆H₅

Cl(CH₂)₃N⊕(CH₃)₃Cl⊖

The quaternized siliceous supports of the instant invention may be represented by the formula:

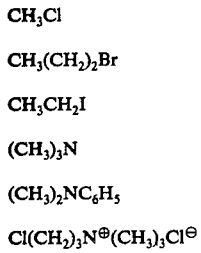

wherein
  $R_4$, $R_8$, $R_9$, $R_{10}$ and X are as defined above; and,
  Si¹ may be a silicon atom on the support surface or on an adjacent silane moiety.

Conventional gel permeation chromatographic principles are utilized in the practice of this invention and such factors as column length, column diameter and flow rate are readily determinable by those having ordinary skill in the art.

The ionic polymers to be separated are generally water soluble or are soluble in aqueous electrolyte solutions. In the latter case, care must be taken to insure that the support employed is not soluble therein. In those instances where the ionic polymers are water or aqueous media-insoluble, suitable polar solvents may be employed in which the supports are insoluble.

These polymers may be cationic homopolymers or cationic copolymers containing nonionic and/or anionic units. Polymers having a net cationic content of as little as about 1 mole percent may be fractionated in accordance with the method of this invention.

BRIEF DESCRIPTION OF THE DRAWINGS

The invention will be better understood by the accompanying drawings wherein.

EXAMPLE 1

Figure 1:
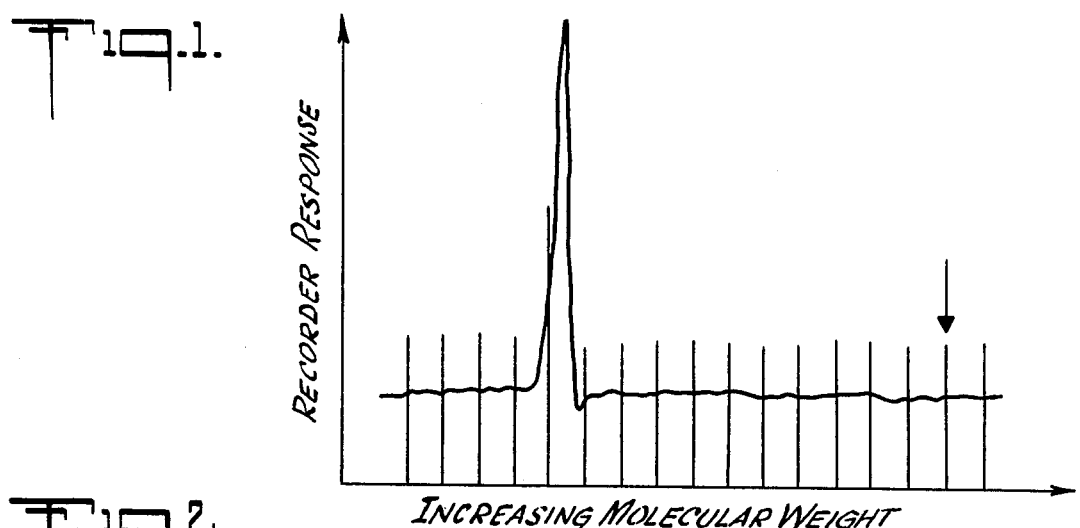
FIGS. 1 to 5 are representative chromatograms for materials fractionated in accordance with the method of this invention.

To 50 cc. of a 1000Å controlled pore glass was added 60 grams of a 10% aqueous solution of γ-aminopropyltriethoxysilane. After evacuation to cessation of bubbling to remove air trapped in the pores, the mixture was placed in an oven and held at 75° C. for about 2 hrs. The cooled beads were washed exhaustively with water on a Buchner funnel and then dried overnight at 100° C. to polymerize the silicone layer. Quaternization was performed by treating the beads with about a 5% solution of Cation M-1 of Story Chemical Co., which is Cl—CH₂CH(OH) CH₂N (CH₃)₃ Cl. The M-1 solution was buffered at pH 7.4 by a standard phosphate buffer to ensure that HCl generated by the quaternization reaction would not protonate adjacent amino groups and prevent them from reacting. The M-1/bead mixture was held at 85° C. overnight. The final step was washing with water and drying.

The reactions may be summarized as follows:

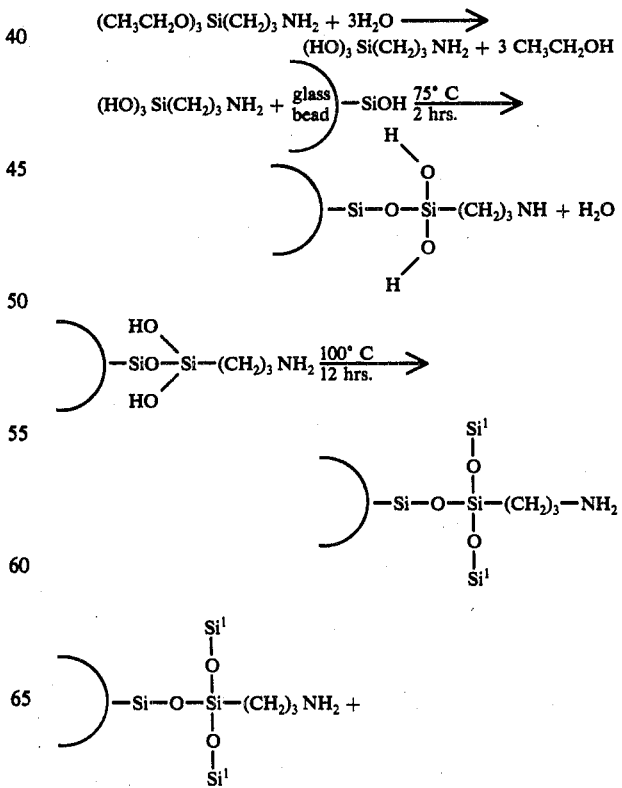

-continued

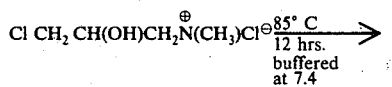

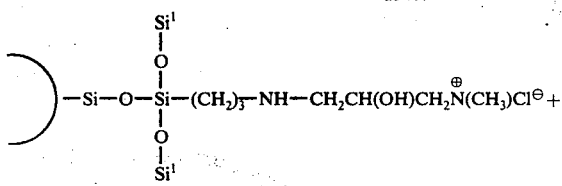

wherein Si¹ may be a silicon atom on the support surface or an adjacent silane moiety.

EXAMPLE 2

To 125 cc. of a 75 Å controlled pore glass was added 150 cc. of a 10% aqueous solution of γ-aminopropyltriethoxysilane. After evacuation to cessation of bubbling to remove air trapped in the pores, the mixture was placed in an oven and held at 75° C. for about 2 hrs. The cooled beads were washed exhaustively with water on a Buchner funnel and then dried overnight at 105° C. to polymerize the silicone layer. Quaternization was performed by treating the beads with 30 cc. of about a 5% solution of Cation M-1 of Story Chemical Co., which is Cl—$CH_2CH(OH)$ $CH_2N$ $(CH_3)_3$ Cl. The M-1 solution was buffered at pH 7.4 by 400 cc. of a standard phosphate buffer (0.03M sodium phosphate and 0.0087M potassium phosphate) to ensure that HCl generated by the quaternization reaction would not protonate adjacent amino groups and prevent them from reacting. The M-1/bead mixture was held at 85° C. overnight. The final step was washing with water and drying.

EXAMPLE 3

To 125 cc. of a 500 Å controlled pore glass was added 150 cc. of a 10% aqueous solution of γ-aminopropyltriethoxysilane. After evacuation to cessation of bubbling to remove air trapped in the pores, the mixture was placed in an oven and held at 75° C. for about 2 hrs. The cooled beads were washed exhaustively with water on a Buchner funnel and then dried overnight at 105° C. to polymerize the silicone layer. Quaternization was performed by treating the beads with 30 cc. of about a 5% solution of Cation M-1 of Story Chemical Co., which is Cl—$CH_2CH(OH)$ $CH_2N$ $(CH_3)_3$ Cl. The M-1 solution was buffered at pH 7.4 by 400 cc. of a standard phosphate buffer to ensure that HCl generated by the quaternization reaction would not protonate adjacent amino groups and prevent them from reacting. The M-1/bead mixture was held at 85° C. overnight. The final step was washing with water and drying.

EXAMPLE 4

To 125 cc. of a 2000 Å controlled pore glass was added 150 cc. of a 10% aqueous solution of γ-aminopropyltriethoxysilane. After evacuation to cessation of bubbling to remove air trapped in the pores, the mixture was placed in an oven and held at 75° C. for about 3 hrs. The cooled beads were washed exhaustively with water on a Buchner funnel and then dried overnight at 105° C. to polymerize the silicone layer. Quaternization was performed by treating the beads with 30 cc. of about a 5% solution of Cation M-1 of Story Chemical Co., which is Cl—$CH_2CH(OH)$ $CH_2N$ $(CH_3)_3$ Cl. The M-1 solution was buffered at pH 7.4 by 400 cc. of a standard phosphate buffer to ensure that HCl generated by the quaternization reaction would not protonate adjacent amino groups and prevent them from reacting. The M-1/bead mixture was held at 85° C. overnight. The final step was washing with water and drying.

EXAMPLE 5

To 50 cc. of a 170 Å controlled pore glass was added 60 grams of a 10% aqueous solution of γ-aminopropyltriethoxysilane. After evacuation to cessation of bubbling to remove air trapped in the pores, the mixture was placed in an oven and held at 75° C. for about 3 hrs. The cooled beads were washed exhaustively with water on a Buchner funnel and then dried overnight at 105° C. to polymerize the silicone layer. Quaternization was performed by treating the beads with 30 cc. of about a 5% solution of Cation M-1 of Story Chemical Co., which is Cl—$CH_2CH(OH)$ ($CH_2N$ $(CH_3)_3$ Cl. The M-1 solution was buffered at pH 7.4 by 400 cc. of a standard phosphate buffer to ensure that HCl generated by the quaternization reaction would not protonate adjacent amino groups and prevent them from reacting. The M-1/bead mixture was held at 85° C. overnight. The final step was washing with water and drying.

EXAMPLE 6

To 125 cc. of Porasil F (1500 Å) was added 150 cc. of a 10% aqueous solution of γ-aminopropyltriethoxysilane. After evacuation to cessation of bubbling to remove air trapped in the pores, the mixture was placed in an oven and held at 75° C. for about 2 hrs. The cooled support was washed exhaustively with water on a Buchner funnel and then dried overnight at 105° C. to polymerize the silicone layer. Quaternization was performed by treating the support with 30 cc. of about a 5% solution of Cation M-1 of Story Chemical Co., which is Cl—$CH_2CH(OH)$ $CH_2N$ $(CH_3)_3$ Cl. The M-1 solution was buffered at pH 7.4 by 400 cc. of a standard phosphate buffer (0.03M sodium phosphate and 0.0087M potassium phosphate) to ensure that HCl generated by the quaternization reaction would not protonate adjacent amino groups and prevent them from reacting. The M-1/support mixture was held at 85° C. overnight. The final step was washing with water and drying.

EXAMPLE 7

Quaternized siliceous supports, ranging in size from 75 Å to 2000 Å (75, 170, 350, 500, 1000 and 2000 Å), were equilibrated in 0.1N $HNO_3$ eluent overnight to fill the pores with eluent. The beads were then slurry packed using 0.1N $HNO_3$ into stainless steel columns (height—3 feet; inner diameter—0.33 inches). To ensure more efficient column packing, vibration was also employed. The packed column was installed in a Waters Associates Model GPC-301 Chromatograph and equilibrated overnight with flowing (~1 cc./min.) 0.1N $HNO_3$ eluent. Upon operation at a pressure of 175 psi. and a flow rate of 0.8 ml./min., results, expressed as peak positions, are shown in Table I.

Table I

Peak Positions in Counts of Various Samples on Quaternized Glass Columns

| Column (Å Size) | DMP | High Mol. Wt. Poly (DMDAAC) | Poly (AMBTAC) | P2VP #7 | Low Mol. Wt. Poly (DMDAAC) |
|---|---|---|---|---|---|
| 75 | 5.7 | 4.4 | | 4.5 | |
| 170 | 8.2 | 5.6 | | | |
| 350 | 6.8 | | | | 6.1 |
| 500 | 7.5 | | | 4.5 | 4.6 |
| 1000 | 7.6 | 6.4 | 5.5 | 6.0 | |
| 2000 | 13.3 | 13.0 | 7 up* | | |

DMP = dimethylpiperidinium chloride
Poly(AMBTAC) = poly(2-acrylamido-2-methylbutyltrimethyl-ammonium chloride), $[\eta] > 7$ dl. /g. in 1 N NaCl
P2VP #7 = poly(2-vinylpyridine), monodisperse, molecular weight about $5 \times 10^5$
Poly(DMDAAC) = poly(dimethyldiallylammonium chloride)
*broad, multiple peaks covering the range exclusion to penetration.

FIG. 1 is a chromatogram for a standard injection of distilled water to measure the column plate count (result: 640 plates/foot) in a Waters Model 301 Gel Permeation Chromatograph having a stainless steel column (height—3 feet; inner diameter—0.33 inches) packed with 200/400 mesh 1422 Å pore size quaternized controlled pore glass. The eluent was 0.1N nitric acid, the operating pressure 175 psi., the flow rate 0.8 ml./min., the detector a differential refractometer, the attenuation 4X, the injection size 2 ml. and the chart speed 3 in./hr. The peak marks the total penetration volume and demonstrates the high plate counts achievable with the treated siliceous supports of this invention.

Figure 2:
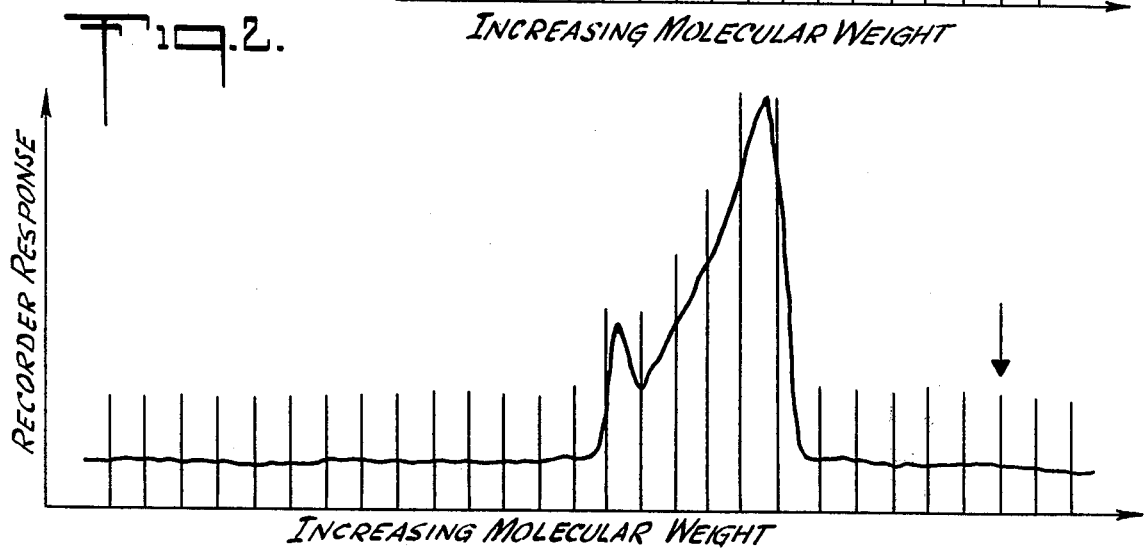

FIG. 2 is a chromatogram for a 0.2 weight percent solution of a 3 mole percent cationic acrylamide copolymer (3 mole percent methacrylamidopropyltrimethylammonium chloride; 97 mole percent acrylamide) in a Waters Model 301 Gel Permeation Chromatograph having a stainless steel column (height—3 feet; inner diameter—0.33 inches) packed with 200/400 mesh 1422 Å pore size quaternized controlled pore glass. The eluent was 0.1N nitric acid, the operating pressure 175 psi., the flow rate 0.8 ml./min., the detector a differential refractometer, the attenuation 4X, the injection size 2 ml. and the chart speed 3 in./hr. This profile illustrates the ability to chromatograph a polymer having a vanishingly small quaternary fraction. The polymer covers the range from total exclusion (about count 6.3) to total penetration (about count 10.7) with no evidence of on-column adsorption. The total penetration volume is marked by the residual monomer peak.

Figure 3:
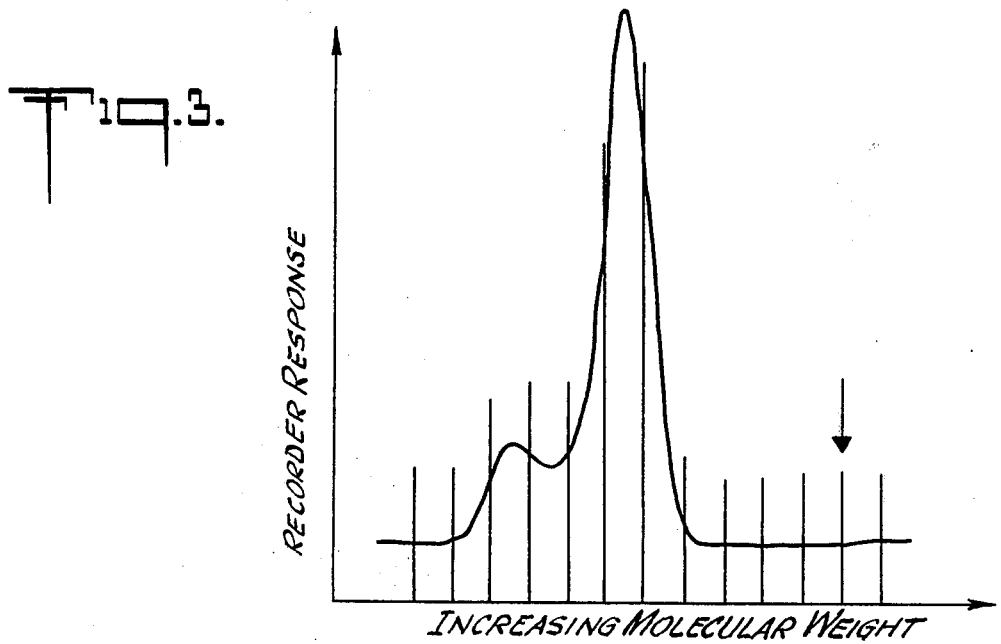

FIG. 3 is a chromatogram for a 0.25 weight percent solution of a low molecular weight poly(diallyldimethylammonium chloride) in a Waters Model 301 Gel Permeation Chromatograph having a stainless steel column (height—3 feet; inner diameter—0.33 inches) packed with 200/400 mesh 170 Å pore size quaternized controlled pore glass. The eluent was 0.1N nitric acid, the operating pressure 175 psi., the flow rate 1.0 ml./min., the detector a differential refractometer, the attenuation 8X, the injection size 2 ml. and the chart speed 6 in./hr. The large, symmetrical peak is an example of a completely fractionated very low molecular weight poly(diallyldimethylammonium chloride) polymer. Note the almost total absence of exclusion (about count 4.5) and the very small degree of total penetration (about count 8.5). The symmetry of the large peak is possible only with a chromatographic system which is completely devoid of solute adsorption.

Figure 4:
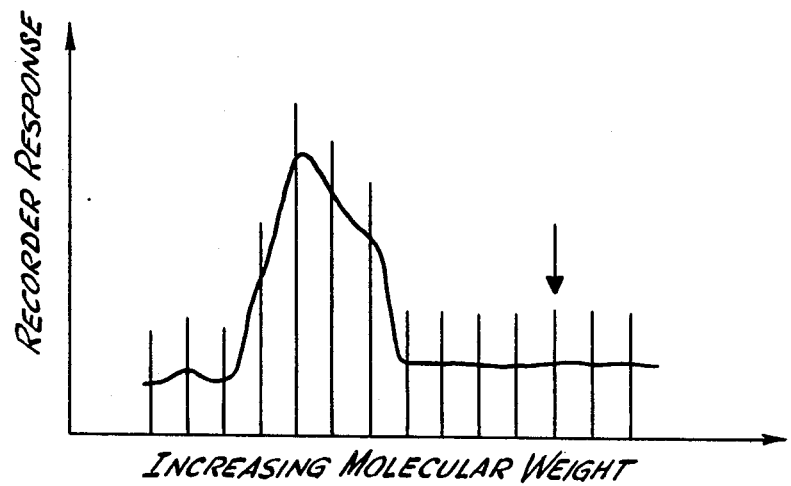

FIG. 4 is a chromatogram for a 0.25 weight percent solution of a low molecular weight poly(diallyldimethylammonium chloride) in a Waters Model 301 Gel Permeation Chromatograph having a stainless steel column (height—3 feet; inner diameter—0.33 inches) packed with 200/400 mesh 500 Å pore size quaternized controlled pore glass. The eluent was 0.1N nitric acid, the operating pressure 175 psi., the flow rate 1.0 ml./min., the detector a differential refractometer, the attenuation 8X, the injection size 2 ml. and the chart speed 6 in./hr. The apparently trimodal peak is due to a relatively low molecular weight poly(diallyldimethylammonium chloride) polymer which is partially excluded (about count 4.6), predominantly fractionated (about count 4.6–8.0) and partially penetrating (about count 8.0). The small peak at about count 10.0 is a chromatographic artifact.

Figure 5:
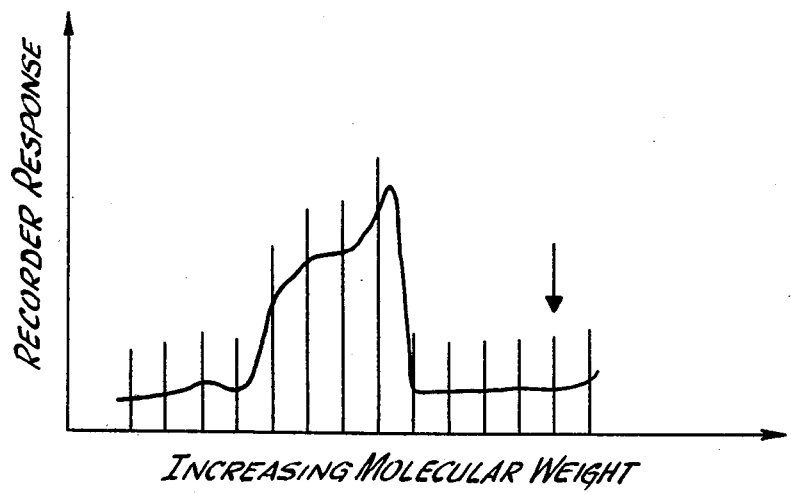

FIG. 5 is a chromatogram for a 0.25 weight percent solution of a high molecular weight poly(diallyldimethylammonium chloride) in a Waters Model 301 Gel Permeation Chromatograph having a stainless steel column (height—3 feet; inner diameter—0.33 inches) packed with 200/400 mesh 500 Å pore size quaternized controlled pore glass. The eluent was 0.1N nitric acid, the operating pressure 175 psi., the flow rate 1.0 ml./min., the detector a differential refractometer, the attenuation 8X, the injection size 2 ml. and the chart speed 6 in./hr. Chromatography of a relatively high molecular weight poly(diallyldimethylammonium chloride) polymer on the column of FIG. 4 shows predominant exclusion with correspondingly less of the sample available for fractionation and total penetration.

We claim:

1. A support for the size separation of cationic polymers which comprises a rigid, non-swellable controlled porosity support of the formula:

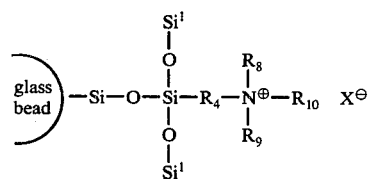

wherein $R_4$ may be a hydrocarbon chain containing one to eight carbon units per quaternizable X group or a single aryl ring;

$R_8$, $R_9$ and $R_{10}$ each may be a hydrocarbon chain containing one to four carbon units per quaternized group or other hydrophilic group or a single aryl ring;

$Si^1$ may be a silicon atom on the support surface or on an adjacent silane moiety; and, X is halogen.

2. A support as in claim 1 wherein $R_4$ is a hydrocarbon chain containing one to four carbon units per quaternizable X group and X is chloro.

3. A gel permeation chromatographic method for the separation of molecular weight fractions of a cationic polymer which comprises passing a solution of said polymer through a porous chromatography bed of a rigid, non-swellable, controlled porosity glass support having a porosity of from about 50 to about 25,000 Angstroms, said support having a quaternized siliceous surface which is prepared by treating the siliceous surface with a silane compound and a quaternizing agent.

4. A gel permeation chromatography method as in claim 3 wherein the cationic polymer is a homopolymer or a copolymer which contains at least about 1 weight percent of net cationic constituents.

5. A gel permeation chromatography method as in claim 3 wherein the molecular weight fractions are successively eluted from said gel chromatography bed and collected.

6. A gel permeation chromatography method as in claim 3 wherein the silane compound is a compound of the formula:

$$R_2-\underset{\underset{R_3}{|}}{\overset{\overset{R_1}{|}}{Si}}-R_4-X \qquad \text{I.}$$

or $$R_2-\underset{\underset{R_3}{|}}{\overset{\overset{R_1}{|}}{Si}}-R_4-N\underset{R_6}{\overset{R_5}{\diagup}} \qquad \text{II.}$$

wherein $R_1$, $R_2$ and $R_3$ each may be halogen, hydroxy, alkoxy, aryloxy, or an alkyl or aryl ester;

$R_4$ may be a hydrocarbon chain containing one to eight carbon units per quaternizable X group or a single aryl ring;

$R_5$ and $R_6$ each may be hydrogen or a hydrocarbon chain containing one to four carbon units; and, X is halogen.

7. A gel permeation chromatography method as in claim 6 wherein $R_4$ is a hydrocarbon chain containing one to four carbon units per quaternizable X group and X is chloro.

8. A gel permeation chromatography method as in claim 6 wherein the silane compound is 3-aminopropyltriethoxysilane.

9. A gel permeation chromatography method as in claim 3 wherein the quaternizing agent is a compound of the formula:

$$R_7-X \qquad \text{III.}$$

or $$\underset{R_9}{\overset{R_8}{\diagdown}}N-R_{10} \qquad \text{IV.}$$

wherein $R_7$, $R_8$, $R_9$ and $R_{10}$ each may be a hydrocarbon chain containing one to four carbon units per quaternized group or other hydrophilic group or a single aryl ring; and, X is halogen.

10. A gel permeation chromatography method as in claim 9 wherein the quaternizing agent is 1-chloro-2-hydroxy-3-(trimethylammonium) chloride.

11. A gel permeation chromatographic method for the separation of molecular weight fractions of a cationic polymer which comprises passing a solution of said polymer through a porous chromatography bed of a rigid, non-swellable, controlled porosity glass support having a porosity of from about 50 to about 25,000 Angstroms, said support having the formula:

$$\left(\text{glass bead}\right)-Si-O-\underset{\underset{\underset{Si^1}{|}}{\overset{|}{O}}}{\overset{\overset{\overset{Si^1}{|}}{O}}{Si}}-R_4-\overset{\overset{R_8}{|}}{N^\oplus}-R_{10} \quad X^\ominus$$

wherein $R_4$ may be a hydrocarbon chain containing one to eight carbon units per quaternizable X group or a single aryl ring;

$R_8$, $R_9$ and $R_{10}$ each may be a hydrocarbon chain containing one to four carbon units per quaternized group or other hydrophilic group or a single aryl ring;

$Si^1$ may be a silicon atom on the support surface or on an adjacent silane moiety; and, X is halogen.

12. A gel permeation chromatographic method as in claim 11 wherein $R_4$ is a hydrocarbon chain containing one to four carbon units per quaternizable X group and X is chloro.

13. A quaternized controlled porosity glass support for the size separation of cationic polymers which comprises a rigid, non-swellable, controlled porosity glass support having a porosity of from about 50 to about 25,000 Angstroms, said support having a quaternized siliceous surface which is prepared by treating the siliceous surface with a silane compound and a quaternizing agent wherein the silane compound is a compound of the formula:

$$R_2-\underset{\underset{R_3}{|}}{\overset{\overset{R_1}{|}}{Si}}-R_4-X \qquad \text{I.}$$

or $$R_2-\underset{\underset{R_3}{|}}{\overset{\overset{R_1}{|}}{Si}}-R_4-N\underset{R_6}{\overset{R_5}{\diagup}} \qquad \text{II.}$$

14. A quaternized porous glass support as in claim 13 wherein $R_4$ is a hydrocarbon chain containing one to four carbon units per quaternizable X group and X is chloro.

15. A quaternized porous glass support as in claim 13 wherein the silane compound is 3-aminopropyltriethoxysilane.

16. A quaternized porous glass support as in claim 13 wherein the quaternizing agent is a compound of the formula:

$$R_7-X \qquad \text{III.}$$

-continued
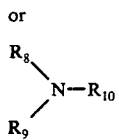
IV.
wherein $R_7$, $R_8$, $R_9$ and $R_{10}$ each may be a hydrocarbon chain containing one to four carbon units per quaternized group or other hydrophilic group or a single aryl ring; and, X is halogen.
17. A quaternized porous glass support as in claim 16 wherein the quaternizing agent is 1-chloro-2-hydroxy-3-(trimethylammonium) chloride.
* * * * *

UNITED STATES PATENT OFFICE
CERTIFICATE OF CORRECTION

Patent No. 4,118,316      Dated October 3, 1978

Inventor(s) Charles P. Talley et al

It is certified that error appears in the above-identified patent and that said Letters Patent are hereby corrected as shown below:

The issue date of the patent should be October 3, 1978, not October 3, 1973.

Column 10, Claim 13, after Formula II, an insertion to read as follows:

"wherein
    $R_1$, $R_2$ and $R_3$ each may be halogen, hydroxy, alkoxy, aryloxy, or an alkyl or aryl ester;
    $R_4$ may be a hydrocarbon chain containing one to eight carbon units per quaternizable X group or a single aryl ring;
    $R_5$ and $R_6$ each may be hydrogen or a hydrocarbon chain containing one to four carbon units; and,
    X is halogen."

Signed and Sealed this

Twenty-seventh Day of February 1979

[SEAL]

Attest:

RUTH C. MASON  
Attesting Officer

DONALD W. BANNER  
Commissioner of Patents and Trademarks